United States Patent
Qi et al.

(10) Patent No.: US 10,218,797 B2
(45) Date of Patent: Feb. 26, 2019

(54) COMMUNICATING ROUTING MESSAGES USING SERVICE DISCOVERY IN NEIGHBOR AWARENESS NETWORKS

(71) Applicant: Intel IP Corporation, Santa Clara, CA (US)

(72) Inventors: Emily H. Qi, Gig Harbor, WA (US); Dave Cavalcanti, Portland, OR (US); Po-Kai Huang, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 24 days.

(21) Appl. No.: 15/392,722

(22) Filed: Dec. 28, 2016

(65) Prior Publication Data

US 2017/0353560 A1    Dec. 7, 2017

Related U.S. Application Data

(60) Provisional application No. 62/346,180, filed on Jun. 6, 2016.

(51) Int. Cl.
| | |
|---|---|
| *H04W 4/00* | (2018.01) |
| *H04L 29/08* | (2006.01) |
| *H04W 48/16* | (2009.01) |
| *H04W 40/24* | (2009.01) |

(52) U.S. Cl.
CPC ........... *H04L 67/16* (2013.01); *H04W 40/246* (2013.01); *H04W 48/16* (2013.01); *H04L 67/104* (2013.01)

(58) Field of Classification Search
CPC ..... H04L 12/741; H04L 12/751; H04L 29/08; H04L 29/12; H04L 45/02; H04L 45/745; H04L 61/35; H04L 67/16; H04L 69/321; H04W 8/005; H04W 48/16; H04W 4/80
See application file for complete search history.

(56) References Cited

U.S. PATENT DOCUMENTS

| | | | | |
|---|---|---|---|---|
| 9,154,934 | B2* | 10/2015 | Yang | H04W 8/005 |
| 9,204,244 | B2* | 12/2015 | Rantala | H04W 4/008 |
| 9,398,437 | B2* | 7/2016 | Kasslin | H04L 45/745 |
| 2013/0282860 | A1* | 10/2013 | Zhang | H04L 45/306 |
| | | | | 709/217 |
| 2015/0351146 | A1* | 12/2015 | Lee | H04W 76/023 |
| | | | | 370/329 |
| 2015/0382278 | A1* | 12/2015 | Fallon | H04W 40/04 |
| | | | | 370/338 |
| 2016/0036764 | A1* | 2/2016 | Dong | H04L 61/3025 |
| | | | | 370/254 |

(Continued)

OTHER PUBLICATIONS

WI-FI Alliance, Neighbor Awareness Networking Technical Specification, Version 1.0, 98 pages, 2015.*

*Primary Examiner* — Frank Duong
(74) *Attorney, Agent, or Firm* — Eversheds Sutherland (US) LLP

(57) ABSTRACT

This disclosure describes methods, devices, and systems related to communicating routing messages using service discovery in neighbor awareness networks (NAN) and further building a routing table for a mesh network. A device may assign a NAN service name to a routing protocol. The device may determine a NAN service discovery frame comprising a routing protocol message of the routing protocol. The device may cause to send the NAN service discovery frame to a second device during a discovery window.

20 Claims, 7 Drawing Sheets

(56) References Cited

U.S. PATENT DOCUMENTS

2016/0323925 A1* 11/2016 Alanen ................ H04W 8/005
2016/0353269 A1* 12/2016 Kasslin ................ H04W 8/005
2017/0055305 A1*  2/2017 Kurian ................. H04L 5/0012

* cited by examiner

COMMUNICATING ROUTING MESSAGES USING SERVICE DISCOVERY IN NEIGHBOR AWARENESS NETWORKS

CROSS-REFERENCE TO RELATED APPLICATIONS

This application claims the benefit of U.S. Provisional Application Ser. No. 62/346,180, filed on Jun. 6, 2016, the disclosure of which is incorporated herein by reference as if set forth in full.

TECHNICAL FIELD

This disclosure generally relates to systems and methods for wireless communications and, more particularly, systems and methods to communicating routing messages for wireless communication, e.g. in Wireless Local Area Networks (WLANs), and/or Wi-Fi.

BACKGROUND

Neighbor Awareness Networking (NAN) may refer to a specification for Wi-Fi for device and/or service discovery and peer to peer communication. NAN may describe the formation of a cluster of devices (referred to as a NAN cluster) for devices in physical proximity to one another.

DETAILED DESCRIPTION

Figure 1:
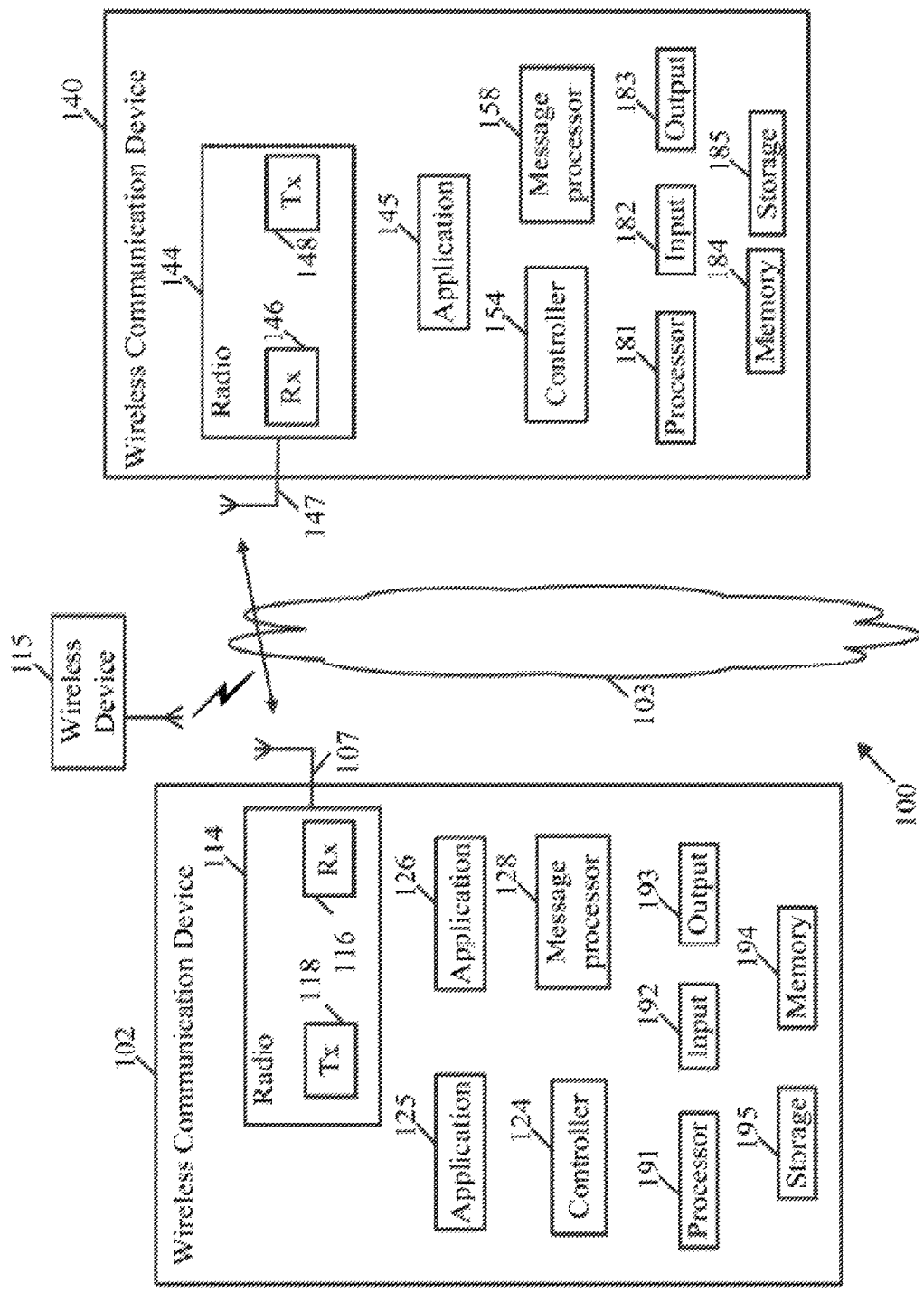
FIG. 1 shows an exemplary network environment in accordance with the systems and methods disclosed herein.

Example embodiments described herein provide certain systems, methods, and devices, for providing signaling information to Wi-Fi devices in various Wi-Fi networks, including, but not limited to, Neighbor Awareness Networks (NAN).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As Internet of Things (IoT) applications increase, there is a strong desire to extend the range of wireless networks and to forward wireless network data packets to edge devices. The construction of routing tables is a very important and challenging task associated with data packet forwarding. Most developed routing protocols, which are IP based (or above layer 2), assume that layer 2 (i.e., the data link layer) links have been established. However, in many wireless networks, layer 2 links may vary dynamically due to channel conditions, mobility, node failures, etc. Moreover, wireless networks utilizing layer 2 links may include spatially distributed autonomous devices which usually operate untethered and additionally have limited power resources, thereby limiting their communication capabilities.

Example embodiments of the present disclosure relate to methods, devices, and systems related to communicating routing messages using service discovery in NAN. As Internet of Things (IoT) applications increase, there is an increasing need to extend the range of wireless networks and forward data packets to edging devices. Most developed routing protocols are internet protocol (IP) based or above Layer 2, which assumes that a link in the datalink layer (Layer 2) has been established. However, the stability of the aforementioned link may vary dynamically (due to channel conditions, mobility, node failures, etc.). Moreover, link stability may also be compromised in networks containing spatially distributed autonomous devices (e.g., NAN devices) that typically operate untethered and additionally have limited power resources for maintaining links between devices.

In one embodiment, a routing protocol (e.g., a mesh routing protocol) may be defined as a NAN service and a device may use a NAN service discovery mechanism to advertise and solicit routing discovery, maintenance (e.g., the maintenance of routing tables) and repair messages.

In one embodiment, the device may utilize a NAN Engine for receiving routing messages. The NAN engine does not interpret the routing messages but rather may pass the routing messages through to an 802.11 MAC/PHY or higher layer.

In one embodiment, a sending NAN device may utilize the NAN service discovery mechanism to carry routing messages in a service discovery frame which may be transmitted to other receiving NAN devices in preconfigured awake discovery windows (DW). The receiving device (which supports the same routing protocol as the sending device) may "wake up" to receive the service discovery frame carrying the routing messages at variable DW intervals. For example, a receiving NAN device may wake up every 2 DWs, every 4 DWs, or every 8 DWs, to receive the routing messages. The rate at which the receiving NAN device wakes up to listen for the DW may be configured based on a behavior of the routing protocol.

Embodiments of the disclosure provide a power efficient method for transmitting a routing protocol between wireless devices. It should be understood that, in accordance with various embodiments, any number of different routing protocols may be utilized for exchanging messages between devices and to construct and/or maintain routing tables in a power efficient manner. The embodiments leverage the more energy efficient NAN service discovery mechanism to exchange routing messages and maintain/monitor links between devices.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a network diagram illustrating an example network environment, according to some example embodiments of the present disclosure. As shown in FIG. 1, in some embodiments system 100 may include a wireless communication network including one or more wireless communication devices, e.g., wireless communication devices 102, 115, and/or 140.

In some embodiments, wireless communication devices 102, 115, and/or 140 may include, for example, a User Equipment (UE), a Mobile Device (MD), a Station (STA), an Access Point (AP), a Personal Computer (PC), a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an AN device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some embodiments, device 102 and/or device 115 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some embodiments, some or all of the components of one or more of devices 102, 115 and/or 140 may be enclosed in a common housing or packaging, and may be interconnected or operably associated using one or more wired or wireless links. In other embodiments, components of one or more of devices 102, 115 and/or 140 may be distributed among multiple or separate devices.

In some embodiments, processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some embodiments, input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some embodiments, wireless communication devices 102, 115 and/or 140 may be capable of communicating content, data, information and/or signals via a wireless medium (WM) 103. In some embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some embodiments, devices 102, 115 and/or 140 may include one or more radios including circuitry and/or logic to perform wireless communication between devices 102, 140 and/or one or more other wireless communication devices. For example, device 102 may include a radio 114, and/or device 140 may include a radio 144.

In some embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some embodiments, radios 114 and/or 144 may be configured to communicate over a 2.4 GHz band, a 5 GHz band, an mmWave band, a S1G band, and/or any other band.

In some embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable to transmit and/or receive wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some embodiments, wireless communication devices 102, 115 and/or 140 may form, and/or may communicate as part of, a wireless local area network (WLAN).

In some embodiments, wireless communication devices 102, 115 and/or 140 may form, and/or may communicate as part of, a WiFi network.

In some embodiments, wireless communication devices 102, 115 and/or 140 may form, and/or may communicate as part of, a WiFi Direct (WFD) network, e.g., a WiFi direct services (WFDS) network, and/or may perform the functionality of one or more WFD devices.

In one example, device 102, 115 and/or device 140 may include, or may perform the functionality of a WiFi Direct device.

In some embodiments, wireless communication devices 102, 115 and/or 140 may be capable of performing awareness networking communications, for example, according to an awareness protocol, e.g., a WiFi aware protocol, and/or any other protocol, e.g., as described below.

In some embodiments, wireless communication devices 102, 115 and/or 140 may be capable of forming, and/or communicating as part of, a Neighbor Awareness Networking (NAN) network, e.g., a WiFi NAN or WiFi Aware network, and/or may perform the functionality of one or more NAN devices ("WiFi aware devices").

In some embodiments, wireless communication devices 102, 115 and/or 140 may be configured to form and/or communicate over at least one direct link, for example, a PTP link, e.g., a WiFi direct P2P link or any other PTP link, for example, to enable direct communication between devices 102, 115 and/or 140.

In some embodiments, wireless communication devices 102, 115 and/or 140 may perform the functionality of WFD P2P devices. For example, devices 102, 115 and/or 140 may be able to perform the functionality of a P2P client device, and/or P2P group Owner (GO) device.

In other embodiments, wireless communication devices 102, 115 and/or 140 may form, and/or communicate as part of, any other network and/or perform the functionality of any other wireless devices or stations.

In some embodiments, devices 102, 115 and/or 140 may include one or more applications configured to provide, share, and/or to use one or more services, e.g., a social application, a file sharing application, a media application and/or the like, for example, using an awareness network, NAN network ("WiFi Aware network"), a Peer-to-Peer (PTP) network, a WiFi PTP (P2P) network, a WFD network, or any other network.

In some embodiments, device 102 may execute an application 125 and/or an application 126. In some embodiments, device 140 may execute an application 145.

In some embodiments, devices 102, 115 and/or 140 may be capable of sharing, showing, sending, transferring, printing, outputting, providing, synchronizing, and/or exchanging content, data, and/or information, e.g., between application 145 and applications 125 and/or 126.

In some embodiments, devices 102, 115 and/or 140 may include a controller configured to control one or more functionalities of devices 102, 115 and/or 140, for example, one or more functionalities of communication, e.g., awareness networking communications, WiFi Aware (NAN) communication and/or any other communication, between devices 102, 115 and/or 140 and/or other devices, and/or any other functionality, e.g., as described below. For example, device 102 may include a controller 124, and/or device 140 may include a controller 154.

In some embodiments, controllers 124 and/or 154 may include circuitry and/or logic, e.g., processor circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154. Additionally or alternatively, one or more functionalities of controllers 124 and/or 154 may be implemented by logic, which may be executed by a machine and/or one or more processors, e.g., as described below. In one example, controllers 124 and/or 154 may include one or more processors having circuitry and/or logic to cause a device or a station, e.g., devices 102 and/or 140, to perform one or more functionalities, e.g., as described herein.

In some embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some embodiments, message processors 128 and/or 158 may include circuitry and/or logic, e.g., processor circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some embodiments, at least part of the functionality of message processor 128 may be implemented as part of radio 114, and/or at least part of the functionality of message processor 158 may be implemented as part of radio 144.

In some embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some embodiments, devices 102, 115 and/or 140 may operate as, and/or perform the functionality of, a device or station, for example, an awareness networking device or STA, a NAN device or STA, a NAN2 device or STA, e.g., according to a NAN2 Specification, a WiFi device or STA, a WiFi Aware device or STA, a WFD device or STA, a WLAN device or STA and/or any other device or STA, capable of discovering other devices according to a discovery protocol and/or scheme.

In some embodiments, radios 114 and/or 144 may communicate over wireless communication medium 103 according to an awareness networking scheme, for example, a discovery scheme, for example, a WiFi Aware discovery scheme ("NAN discovery scheme"), or any other awareness networking and/or discovery scheme, e.g., as described below.

In some embodiments, the awareness-networking scheme, e.g., NAN, may enable applications to discover services in their close proximity. For example, the NAN technology may be a low power service discovery, which may, for example, scale efficiently, e.g., in dense Wi-Fi environments.

In some embodiments, a device, e.g., device 102, device 115, and/or device 140, may include one or more blocks and/or entities to perform network awareness functionality. For example, a device, e.g., devices 102, 115 and/or 140, performing the functionality of a NAN device, may include a NAN MAC and/or a Discovery Engine (DE). In one example, controllers 124 and/or 154 may be configured to perform the functionality of the NAN MAC and/or the Discovery engine. In another example, the functionality of the NAN MAC and/or the Discovery engine may be performed by any other element and/or entity of devices 102, 115 and/or 140.

In some embodiments, the awareness networking scheme may include a discovery scheme or protocol, for example, a service discovery scheme, e.g., as described below.

In some embodiments, devices 102, 115 and/or 140 may perform a discovery process according to the awareness networking scheme, for example, to discover each other and/or to establish a wireless communication link, e.g., a directional and/or high throughput wireless communication link and/or any other link.

In some embodiments, devices 102, 115 and/or 140 may be configured to enable time synchronization between device 102, device 115, device 140 and/or one or more other devices, e.g., performing the functionality of Wi-Fi stations (STAs), for example, such that STAs can discover each other more efficiently and/or quickly.

Some embodiments are described below with respect to a NAN discovery scheme, and to NAN discovery frames of the NAN discovery scheme. However, in other embodiments, any other discovery scheme and/or discovery frames may be used.

In some embodiments, the discovery scheme may include a plurality of contention-based discovery windows (DWs).

In some embodiments, communication during the DWs may be configured to enable time synchronization between Wi-Fi stations (STAs), e.g., devices 102, 115 and/or 140, so that STAs can find each other more efficiently during a DW.

In some embodiments, devices of an awareness network, e.g. a NAN network, may form one or more clusters, e.g., in order to publish and/or subscribe for services. A NAN cluster may be defined by an Anchor Master (AM), a "NAN master device", or an "anchor device". In one example, the AM may include a NAN device, which has the highest rank in the NAN cluster.

In some embodiments, NAN data exchange may be reflected by discovery frames, e.g., Publish, Subscribe and/or Follow-Up Service discovery frames (SDF). These frames may include action frames, which may be sent by a device that wishes to publish a service/application, and/or to subscribe to a published service/application at another end.

In one example, one of devices 102, 115 and/or 140, e.g., device 102, may perform the role of an AM. The AM may be configured to transmit one or more beacons. Another one of devices 102, 115 and/or 140, e.g., device 140, may be configured to receive and process the beacons.

In one example, devices 102, 115 and/or 140 may perform the role of NAN devices, e.g., belonging to a NAN cluster, which may share a common set of NAN parameters, for example, including a common NAN timestamp, and/or a common time period between consecutive discovery windows (DWs). The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some embodiments, devices 102, 115 and/or 140 may be configured to discover one another over a predefined communication channel ("the social channel"). In one example, the Channel 6 in the 2.4 GHz band may be defined as the NAN social channel. Any other channel may be used as the social channel.

In some embodiments, devices 102, 115 and/or 140 may transmit discovery frames, e.g., SDFs, during the plurality of DWs, e.g., over the social channel. For example the NAN AM may advertise the time of the DW, during which NAN devices may exchange SDFs.

In one example, devices 102, 115 and/or 140 may transmit the discovery frames to discover each other, for example, to enable using the one or more services provided by applications 125, 126 and/or 145.

In some embodiments, devices 102, 115 and/or 140 may communicate during a DW according to a contention mechanism. For example, devices 102, 115 and/or 140 may check whether or not a channel is unoccupied prior to an attempt to transmit a discovery frame during the discovery window.

In some embodiments, a device of devices 102, 115 and/or 140, e.g., device 102, may not transmit the discovery frame during the DW, e.g., if the channel is occupied. In some embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some embodiments, the discovery frame may not require an acknowledgement frame. According to these embodiments, a transmitter of the discovery frame may not backoff a transmission of the discovery frame.

In some embodiments, the discovery frame transmitted by device 102 during the DW may be configured to enable other devices or services that are running on other devices to discover the services on device 102.

In some embodiments, devices of system 100 may utilize availability information, e.g., in the form of an Availability Interval Bitmap and/or Further Availability Map, for example, to allow a device of devices 102, 115 and/or 140, to advertise its availability, for example, in terms of at least one channel and one or more timeslots, during which the device may be available, e.g., active ("awake"), for example, to perform post-NAN activities.

In one example, the availability information may be communicated as part of an Availability Attribute, e.g., including a 32-bit bitmap for 32 timeslots, for example, wherein each timeslot is 16 milliseconds (ms) long. For example, each bit that is not zero may represent a timeslot, during which a device sending the Availability attribute is to awake and available to send and/or receive data in a specified method.

In some embodiments, devices 102, 115 and/or 140 may be configured to communicate according to a Wi-Fi Aware specification and/or any other awareness networking specification, which may be configured to allow a group of devices to discover other devices/services nearby, e.g., with low power. For example, devices 102, 115 and/or 140 may form a cluster and synchronize to the same clock, e.g., as described above. In one example, all devices of the same cluster may converge on a time period and channel, e.g., a discovery window (DW), to facilitate the discovery of each other's services, e.g., as described above.

In some embodiments, devices 102, 115 and/or 140 may be configured to utilize NAN as a power efficient, and/or scalable, peer to peer technology, for example, to enable Wi-Fi devices to discover devices and/or services in their close proximity. For example, devices 102, 115 and/or 140 may be configured to form a NAN cluster for devices in proximity, and devices in the same NAN cluster may follow the same awake time schedule, e.g., the same DWs, to facilitate cluster formation and/or achieve low power operation, e.g., as described above.

In some embodiments, for example, during the DWs, devices 102, 115 and/or 140 may transmit NAN Service Discovery frames, e.g., to publish services that the devices are interested in or provide and/or to subscribe to one or more published services, e.g., as described above. It is understood that the above descriptions are for purposes of illustration and are not meant to be limiting.

Figure 2:
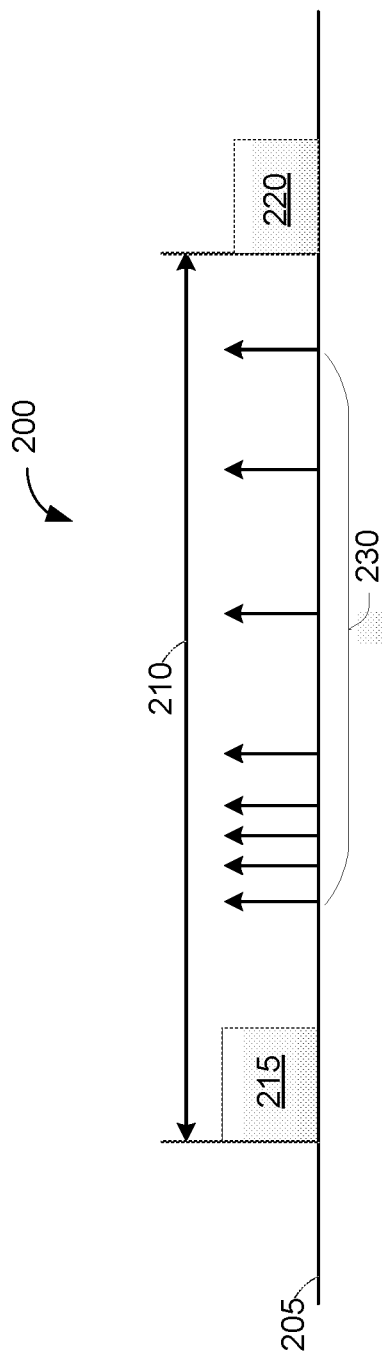
FIG. 2 shows a message flow diagram in accordance with example embodiments of the disclosure.

FIG. 2 shows a message flow diagram 200 in accordance with example embodiments of the disclosure.

In one embodiment, the message flow diagram 200 may include one or more sync beacons 215 that are communicated between two NAN devices (e.g., the devices 102 and 140 of FIG. 1). The sync beacons 215 may be communicated over a channel, in a discovery window (DW) interval 210. The message flow diagram 200 may also include one or more discovery beacons 230 which may also be communicated between two NAN devices (e.g., the devices 102 and 140 of FIG. 1) in the discovery window 210. The message flow diagram 200 may further include one or more service discovery frames (e.g., NAN Service Discovery frames) 220 to publish services that a NAN device may be interested in, provide and/or subscribe to one or more published services.

It should be understood that the sync beacons 215 may be communicated in a DW within the DW interval 210. For example, each sync beacon 215 may be communicated within a DW equal to 16 TU (with each TU being equal to 1024 microseconds) in a DW interval equal to 512 TU. Furthermore, the discovery beacons 230 may be communicated over an interval equal to 100 TU in the DW interval 210.

In some embodiments, routing messages (which may include discovery, maintenance, and/or repair messages) to other devices (e.g., NAN devices) may be carried in the service discovery frames 220 and transmitted in pre-configured awake DWs. For example, NAN devices supporting the same routing protocol may not need to wake up every DW, but may wakeup at a preconfigured number of awake DWs (e.g., every 2 DWs, every 4 DWs, or every 8 DWs) to receive the routing messages. The rate at which a NAN device wakes up to listen to the DW may be configured based on a routing protocol behavior. It is understood that the above descriptions are for purposes of illustration and are not meant to be limiting.

Figure 3:
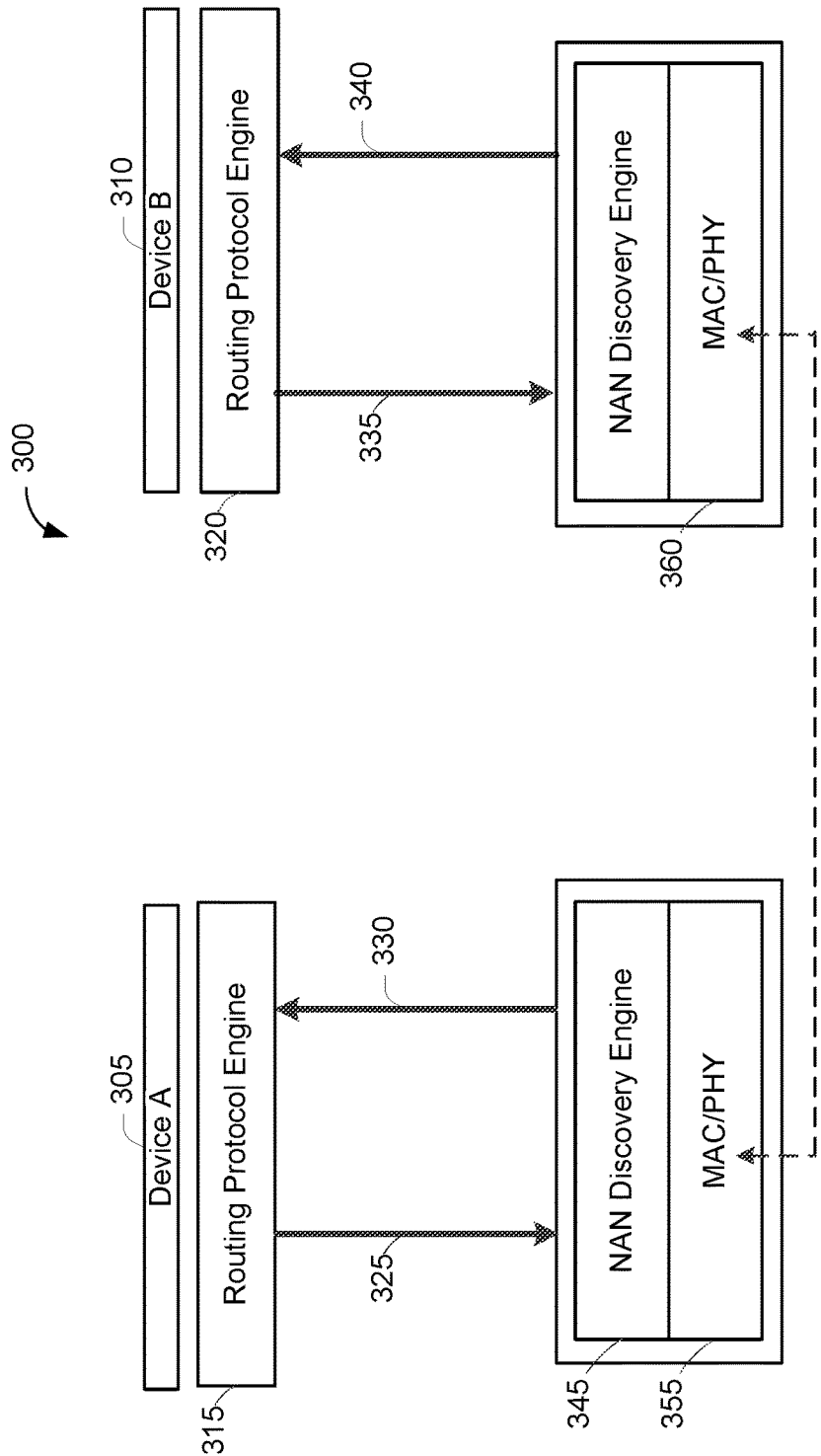
FIG. 3 shows a diagram of an example routing protocol/layer engine in accordance with example embodiments the disclosure.

FIG. 3 shows a diagram of an example routing protocol/layer engine 300 in accordance with example embodiments the disclosure.

As shown in FIG. 3, a device 305 (e.g., Device A) may include a routing protocol engine 315. The routing protocol engine 315 may send routing protocol advertisement/solicitation messages 325, directed to a device 310 (e.g., Device B), to NAN discovery engine 345. The NAN discovery engine 345 may be configured to pass the messages 325 from the routing protocol engine 315 (e.g., an upper layer) to MAC/PHY layers 355 and 360 (e.g., lower layers) for communication to the device 310, via an event message 340, to a routing protocol engine 320. In one embodiment, the MAC/PHY layers 355 and 360 may be IEEE 802.11 MAC/PHY layers.

It should be understood that the message flow described above with respect to the routing protocol/layer engine 300 may also occur in reverse in some embodiments. That is, the routing protocol engine 320 in the device 310 may be configured to send routing protocol advertisement/solicitation messages 335, directed to the device 305, to the NAN discovery engine 360. The NAN discovery engine 360 may be configured to pass the messages 335 from the routing protocol engine 320 (e.g., an upper layer) to MAC/PHY layers 360 and 355 (e.g., lower layers) for communication to the device 305, via an event message 330, to the routing protocol engine 315.

In some embodiments, a routing protocol may be defined as a NAN service. For example, a service name may be defined as a UTF-8 name string (e.g., "nan-routing-protocol-xxxx"). For IPv6 RPL routing protocols, a service name may be defined as "nan-routing-protocol-rpl." For a IPv6 Neighbor Discovery Protocol (NDP), a service name may be defined as "nan-routing-protocol-IPv6NDP."

In some embodiments, advertisement messages (e.g., the messages 325 and 335) may be carried in a NAN Service Discovery Frame (SDF) with the type "Publish." For example, in RPL routing protocols, a DAG Information Object (DIO) and a Destination Advertisement Object (DAO) may be carried in a NAN SDF with the type "Publish." As another example, in IPv6 NDP protocols, neighbor device and router advertisement messages may be carried in the NAN SDF with the type "Publish."

In some embodiments, solicitation messages (e.g., the messages 325 and 335) may be carried a NAN SDF with the type "Publish." For example, in RPL routing protocols, DAG Information Solicitation (DIS) may be carried in a NAN SDF with the type "Subscribe." As another example, in IPv6 NDP protocols, neighbor device and router solicitation messages may be carried in a NAN SDF with the type "Subscribe."

In some embodiments, the routing protocol engines 315 and 320 may be configured to initiate an advertisement, for example, by calling a NAN Publish primitive at the NAN discovery engines 345 and 360, respectively, and/or to initiate a solicitation, for example, by calling a NAN Subscribe primitive at the NAN discovery engines 345 and 360, respectively. When a routing advertisement message (e.g., SDF publish) or a routing solicitation message (e.g., SDF Subscribe) is received, a Discovery Result event or a Replies event may be passed to an upper routing protocol. The routing protocol engines may use the aforementioned event information to construct and maintain a routing table.

In some embodiments, a detailed message of a routing protocol message may be included, for example, in a Service Info field of the Service Descriptor Attribute, which may be included in the NAN Service Discovery frame (SDF), or in any other additional or alternative field and/or attribute. The NAN Discovery engine may not need, for example, to be able to parse these messages.

In some embodiments, the routing protocol engines 315 and 320 may be configured to setup an awake DW Interval in a Publish primitive and/or in a Subscribe primitive, for example, to modify, (e.g., reduce) a wake up interval and/or reduce power consumption. It is understood that the above descriptions are for purposes of illustration and are not meant to be limiting.

Figure 4A:
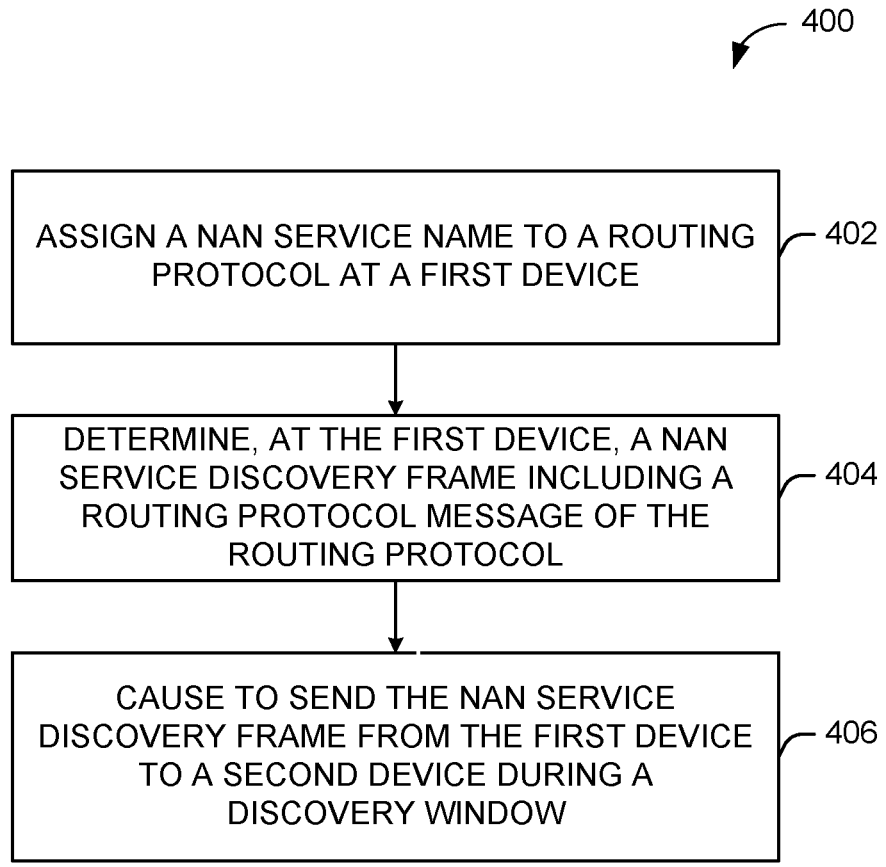
FIG. 4A shows a flow diagram of an illustrative process for communicating routing messages for wireless communication, in accordance with one or more embodiments of the disclosure.

FIG. 4A illustrates a flow diagram of an illustrative process 400 for communicating routing messages for wireless communication, in accordance with one or more embodiments of the disclosure.

At block 402, a device (e.g., the device 102 of FIG. 1), may assign a Neighbor Awareness Network (NAN) service name to a routing protocol. For example, if the routing protocol is an IPv6 RPL protocol, the service name may be defined as "nan-routing-protocol-rpl." If the routing protocol is an IPV6 NDP protocol, the service name may be defined as "nan-routing-protocol-IPv6NDP." It should be understood that any other upper (e.g., Layer 2+) protocol may be used in accordance with one or more embodiments of the disclosure.

At block 404, the device may determine a NAN service discovery frame including a routing protocol message of the routing protocol. In one embodiment, the determination of the NAN service discovery frame may include generating a type of NAN service discovery frame based on a type of a routing protocol message to be communicated. For example, a routing protocol message type may be an advertisement or a solicitation. Thus, based on the aforementioned protocol message types, a NAN service discovery frame may be one of "publish" or "subscribe." In one embodiment, the NAN service discovery frame may include a service information field of a service descriptor attribute. The service information field may include the contents of the routing protocol message.

At block 406, the device may cause to send the NAN service discovery frame to a second device (e.g., the device 115 or the device 140 of FIG. 1) during a discovery window. In one embodiment, the NAN service discovery frame may be sent to an upper layer (e.g., Layer 2+) of the routing protocol. In one embodiment, the device may further be configured to send an event message after the NAN service discovery frame. It is understood that the above descriptions are for purposes of illustration and are not meant to be limiting.

Figure 4B:
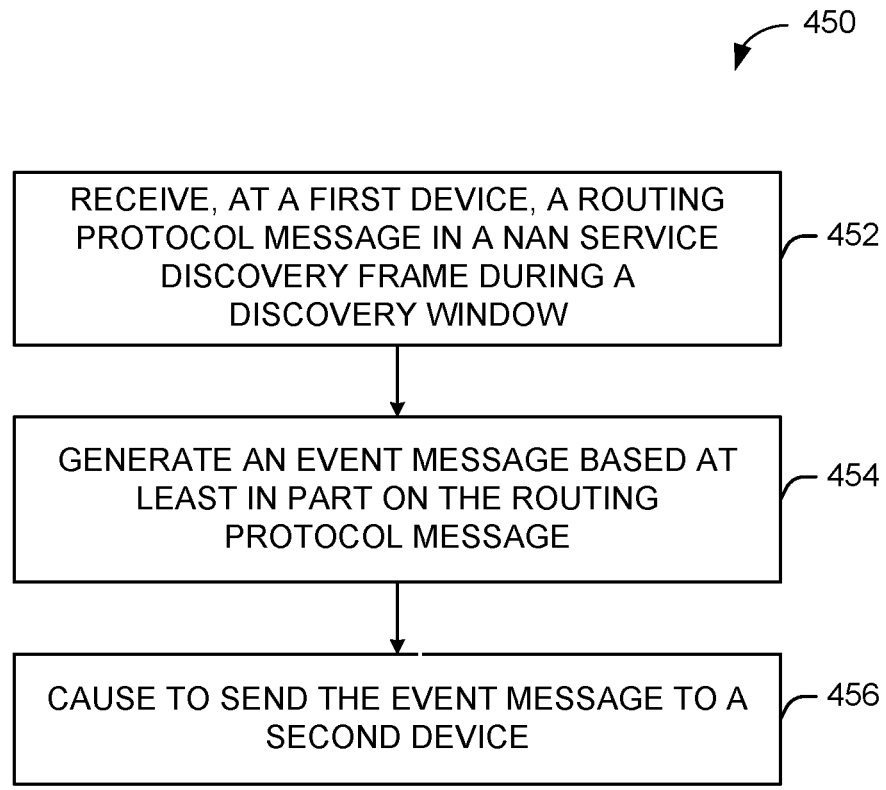
FIG. 4B shows a flow diagram of an illustrative process for communicating routing messages for wireless communication, in accordance with one or more embodiments of the disclosure.

FIG. 4B illustrates a flow diagram of an illustrative process 450 for communicating routing messages for wireless communication, in accordance with one or more embodiments of the disclosure.

At block 452, a device (e.g., the device 115 of FIG. 1) may receive a NAN service discovery frame that includes a routing protocol. The routing protocol message may be associated with a routing protocol. The NAN service discovery frame may be received during a discovery window.

At block 454, the device may generate an event message based at least in part on the routing protocol message. The event message may include information for constructing and/or maintaining a routing table. In one embodiment, the event message may be generated in response to receiving a routing advertisement message (e.g., SDF publish) or a routing solicitation message (e.g., SDF Subscribe) from a NAN discovery engine. In one embodiment, the event message may be a Discovery Result event or a Replies event which is passed up to a routing protocol engine associated with an upper routing protocol (e.g., above Layer 2). The routing protocol engine may utilized the event information to construct and maintain a routing table.

At block 456, the device may cause to send the event message to a second device. It is understood that the above descriptions are for purposes of illustration and are not meant to be limiting.

Figure 5:
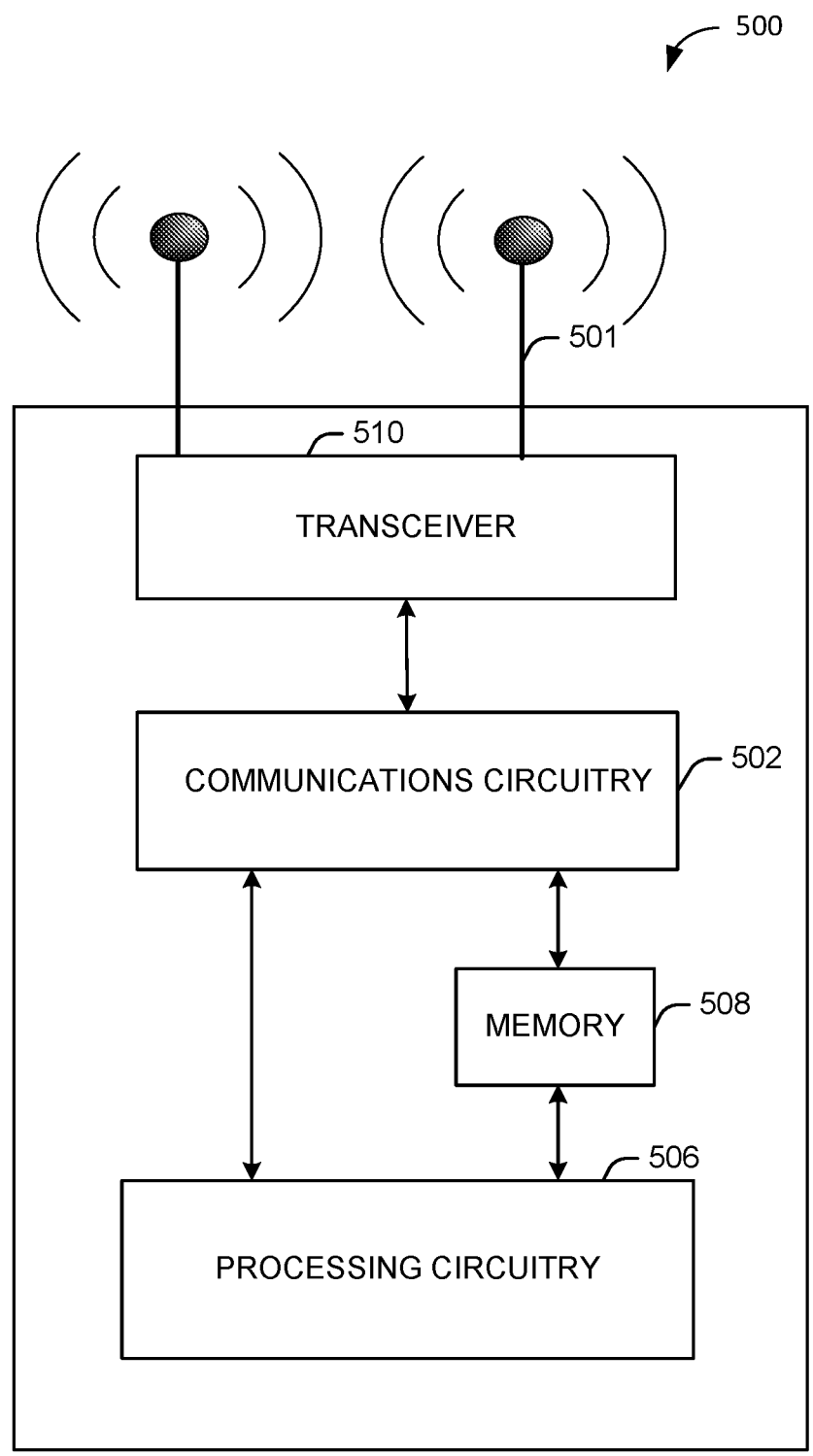
FIG. 5 illustrates a functional diagram of an example communication station that may be suitable for use as a user device, in accordance with one or more example embodiments of the disclosure.

FIG. 5 shows a functional diagram of an exemplary communication station 500 in accordance with some embodiments. In one embodiment, FIG. 5 illustrates a functional block diagram of a communication station that may be suitable for use as the wireless communication devices 102, 115, and 140 of FIG. 1 in accordance with some embodiments. The communication station 500 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that may operate the physical layer communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1-3, 4A, and 4B.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

Figure 6:
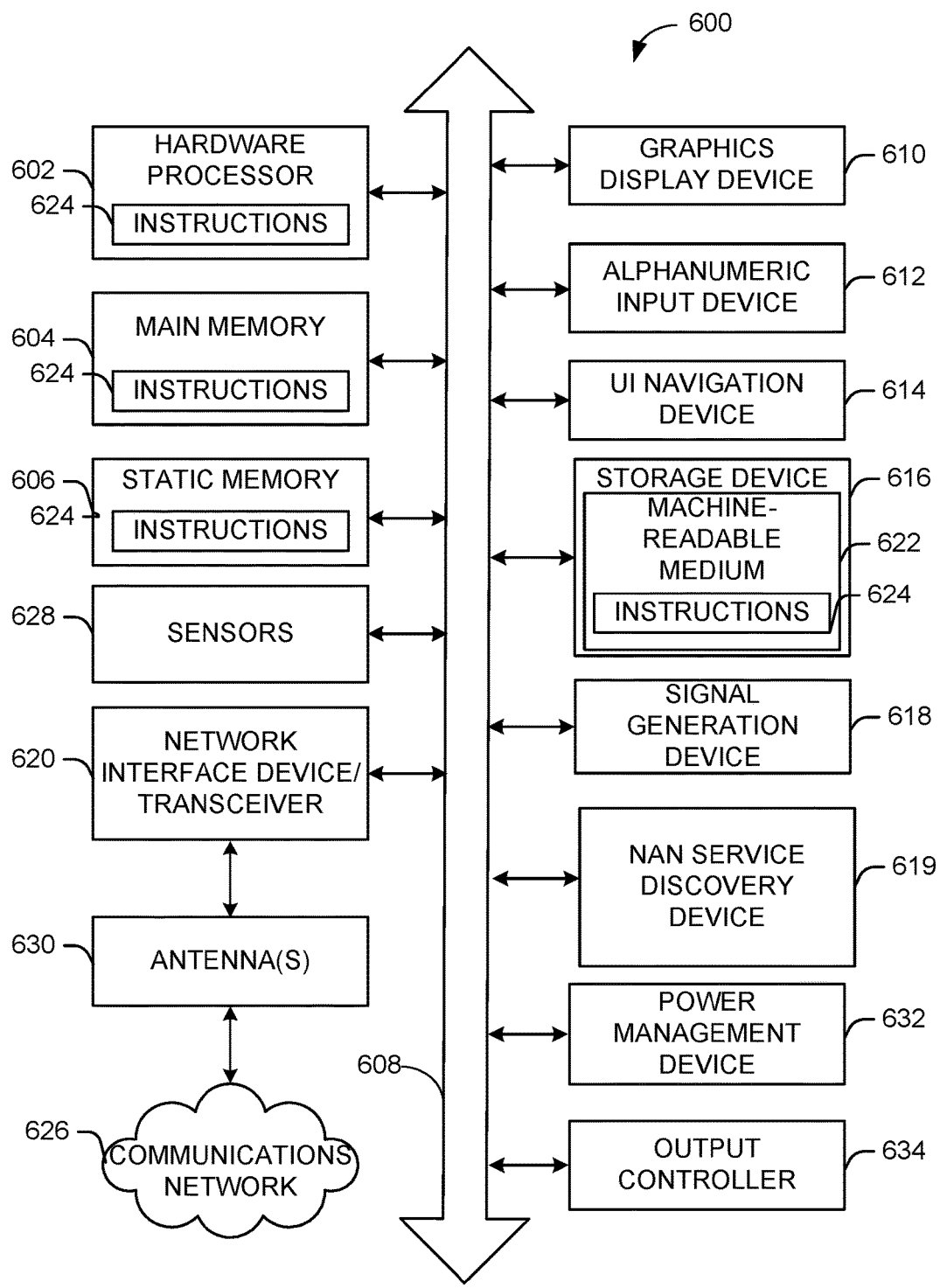
FIG. 6 shows a block diagram of an example machine upon which any of one or more techniques (e.g., methods) may be performed, in accordance with one or more embodiments of the disclosure.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a NAN service discovery device 619, a network interface device/transceiver 620 coupled to antenna(s) 630, and one or more sensors 628, such as a global positioning system (GPS) sensor, compass, accelerometer, or other sensor.

The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The NAN service discovery device 619 may carry out or perform any of the operations and processes (e.g., processes 400 and 450) described and shown above. For example, the NAN service discovery device 619 may be configured to communicate routing messages using service discovery in NAN.

In one embodiment, the NAN service discovery device 619 may be configured to introduce a routing protocol (e.g., a mesh routing protocol) and define the routing protocol as a NAN service. The NAN service discovery device 619 may use a NAN service discovery mechanism to advertise and solicit routing discovery, maintenance (e.g., the maintenance of routing tables) and repair messages.

In one embodiment, the NAN service discovery device 619 may be configured to utilize a NAN engine for receiving routing messages. The NAN engine does not interpret the routing messages but rather may pass the routing messages through to an 802.11 MAC/PHY or higher layer.

In one embodiment, the NAN service discovery device 619 may be configured to utilize the NAN service discovery mechanism to carry routing messages in a service discovery frame which may be transmitted to other receiving NAN devices in preconfigured awake discovery windows (DW). A receiving NAN device (which may support the same routing protocol as the NAN service discovery device 619) may "wake up" to receive the service discovery frame carrying the routing messages at variable DW intervals. For example, a receiving NAN device may wake up every 2 DWs, every 4 DWs, or every 8 DWs, to receive the routing messages. The rate at which the receiving NAN device wakes up to listen for the DW may be configured based on a behavior of the routing protocol.

Embodiments described herein may provide a power efficient method for transmitting a routing protocol between wireless devices. It should be understood that, in accordance with various embodiments, any number of different routing protocols may be utilized for exchanging messages between devices and to construct and/or maintain routing tables in a power efficient manner. The embodiments leverage the more energy efficient NAN service discovery mechanism to exchange routing messages and maintain/monitor links between devices.

It is understood that the above are only a subset of what the NAN service discovery device 619 may be configured to perform and that other functions included throughout this disclosure may also be performed by the NAN service discovery device 619.

The NAN service discovery device 619 may be configured to assign a Neighbor Awareness Network (NAN) service name to a routing protocol; determine a NAN service discovery frame comprising a routing protocol message of the routing protocol; and cause to send the NAN service discovery frame to a second device during a discovery window. The NAN service discovery frame may include service information field of a service descriptor attribute. The service information field may include contents of the routing protocol message.

A type of the NAN service discovery frame may be based, at least on part, on a type of the routing protocol message. The type of the routing protocol message may be an advertisement or a solicitation. The type of the NAN service discovery frame may be publish or subscribe.

The NAN service discovery device 619 may further be configured to cause to send the NAN service discovery frame to an upper layer of the routing protocol.

The NAN service discovery device 619 may further be configured to cause to send an event message after the NAN service discovery frame.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

According to example embodiments of the disclosure, there may be a device. The device may include memory and processing circuitry configured to assign a Neighbor Awareness Network (NAN) service name to a routing protocol. The memory and processing circuitry may be further configured to determine a NAN service discovery frame including a routing protocol message of the routing protocol. The memory and processing circuitry may be further configured to cause to send the NAN service discovery frame to a second device during a discovery window.

The implementations may include one or more of the following features. A type of the NAN service discovery frame may be based at least in part on a type of the routing protocol message. The routing protocol message may be an advertisement or a solicitation. The type of the NAN service discovery frame may be one of publish or subscribe. The memory and processing circuitry may be further configured to cause to send the NAN service discovery frame to an upper layer of the routing protocol. The memory and processing circuitry may be further configured to cause to send an event message after the NAN service discovery frame. The NAN service discovery frame may include a service information field of a service descriptor attribute. The service information field may include contents of the routing protocol message. The device may further include a transceiver configured to transmit and receive wireless signals. The device may further include one or more antennas coupled to the transceiver.

According to example embodiments of the disclosure, there may be a device. The device may include memory and processing circuitry configured to receive a NAN service discovery frame including a routing protocol message associated with a routing protocol during a discovery window. The memory and processing circuitry may be further configured to generate an event message based at least in part on the routing protocol message. The event message may include information for constructing or maintaining a routing table. The memory and processing circuitry may be further configured to cause to send the event message to a second device.

The implementations may include one or more of the following features. A type of the NAN service discovery frame may be based at least in part on a type of the routing protocol message. The routing protocol message may be an advertisement or a solicitation. The type of the NAN service discovery frame may be one of publish or subscribe. The memory and processing circuitry may be further configured to cause to send the NAN service discovery frame to an upper layer of the routing protocol. The memory and processing circuitry may be further configured to cause to send an event message after the NAN service discovery frame. The event message may include a discovery result event or a discovery reply event. The NAN service discovery frame may include a service information field of a service descriptor attribute. The service information field may include contents of the routing protocol message. The device may further include a transceiver configured to transmit and receive wireless signals. The device may further include one or more antennas coupled to the transceiver.

According to example embodiments of the disclosure, there may be a non-transitory computer-readable medium storing computer-executable instructions which, when executed by a processor, cause the processor to perform operations. The operations may include assigning, by a first device, a Neighbor Awareness Network (NAN) service name to a routing protocol. The operations may further include determining, by the first device, a NAN service discovery frame including a routing protocol message of the routing protocol. The operations may further include causing to send, from the first device, the NAN service discovery frame to a second device during a discovery window.

The implementations may include one or more of the following features. A type of the NAN service discovery frame may be based at least in part on a type of the routing protocol message. The type of the routing protocol message may be one of an advertisement or a solicitation. The type of the NAN service discovery frame may include one of publish or subscribe.

According to example embodiments of the disclosure, there may be a non-transitory computer-readable medium storing computer-executable instructions which, when executed by a processor, cause the processor to perform operations. The operations may include receiving, at a first device, a NAN service discovery frame including a routing protocol message associated with a routing protocol during a discovery window. The operations may further include generating an event message based at least in part on the routing protocol message. The event message may include information for constructing or maintaining a routing table. The operations may further include causing to send the event message to a second device.

The implementations may include one or more of the following features. A type of the NAN service discovery frame may be based at least in part on a type of the routing protocol message. The routing protocol message may be an advertisement or a solicitation. The type of the NAN service discovery frame may be one of publish or subscribe. The operations may further include causing to send the NAN service discovery frame to an upper layer of the routing protocol. The operations may further include causing to send an event message after the NAN service discovery frame. The event message may include a discovery result event or a discovery reply event. The NAN service discovery frame may include a service information field of a service descriptor attribute. The service information field may include contents of the routing protocol message.

According to example embodiments of the disclosure, there may include a method. The method may include assigning, by a first device, a Neighbor Awareness Network (NAN) service name to a routing protocol. The method may further include determining, by the first device, a NAN service discovery frame including a routing protocol message of the routing protocol. The method may further include causing to send, from the first device, the NAN service discovery frame to a second device during a discovery window.

The implementations may include one or more of the following features. A type of the NAN service discovery frame may be based at least in part on a type of the routing protocol message. The type of the routing protocol message may be one of an advertisement or a solicitation. The type of the NAN service discovery frame may include one of publish or subscribe.

According to example embodiments of the disclosure, there may include a method. The method may include receiving, at a first device, a NAN service discovery frame including a routing protocol message associated with a routing protocol during a discovery window. The method may further include generating an event message based at least in part on the routing protocol message. The event message may include information for constructing or maintaining a routing table. The method may further include causing to send the event message to a second device.

The implementations may include one or more of the following features. A type of the NAN service discovery frame may be based at least in part on a type of the routing protocol message. The routing protocol message may be an advertisement or a solicitation. The type of the NAN service discovery frame may be one of publish or subscribe. The event message may include a discovery result event or a discovery reply event. The NAN service discovery frame may include a service information field of a service descriptor attribute. The service information field may include contents of the routing protocol message.

In example embodiments of the disclosure, there may be an apparatus. The apparatus may include means for assigning, by a first device, a Neighbor Awareness Network (NAN) service name to a routing protocol. The apparatus may further include means for determining, by the first device, a NAN service discovery frame including a routing protocol message of the routing protocol. The apparatus may further include means for causing to send, from the first device, the NAN service discovery frame to a second device during a discovery window.

The implementations may include one or more of the following features. A type of the NAN service discovery frame may be based at least in part on a type of the routing protocol message. The type of the routing protocol message may be one of an advertisement or a solicitation. The type of the NAN service discovery frame may include one of publish or subscribe.

In example embodiments of the disclosure, there may be an apparatus. The apparatus may include means for receiving, at a first device, a NAN service discovery frame including a routing protocol message associated with a routing protocol during a discovery window. The apparatus may further include means for generating an event message based at least in part on the routing protocol message. The event message may include information for constructing or maintaining a routing table. The apparatus may further include means for causing to send the event message to a second device.

The implementations may include one or more of the following features. A type of the NAN service discovery frame may be based at least in part on a type of the routing protocol message. The routing protocol message may be an advertisement or a solicitation. The type of the NAN service discovery frame may be one of publish or subscribe. The event message may include a discovery result event or a discovery reply event. The NAN service discovery frame may include a service information field of a service descriptor attribute. The service information field may include contents of the routing protocol message.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising a memory and processing circuitry configured to:
   assign a Neighbor Awareness Network (NAN) service name to a routing protocol;
   determine a NAN service discovery frame comprising a routing protocol message of the routing protocol, wherein the routing protocol message includes information for constructing or maintaining a routing table for a mesh network; and
   cause to send the NAN service discovery frame to a second device during a discovery window, wherein the NAN service discovery frame comprises an indication to initiate an advertisement or a solicitation.

2. The device of claim 1, wherein a type of the NAN service discovery frame is based at least in part on a type of the routing protocol message.

3. The device of claim 2, wherein the type of the routing protocol message comprises at least one of an advertisement or a solicitation.

4. The device of claim 2, wherein the type of the NAN service discovery frame comprises one of publish or subscribe.

5. The device of claim 1, wherein the memory and processing circuitry is further configured to cause to send the NAN service discovery frame to an upper layer of the routing protocol.

6. The device of claim 1, wherein the memory and processing circuitry is further configured to cause to send an event message after the NAN service discovery frame.

7. The device of claim 1, wherein the NAN service discovery frame comprises a service information field of a service descriptor attribute, the service information field comprising contents of the routing protocol message.

8. The device of claim 1, further comprising a transceiver configured to transmit and receive wireless signals.

9. The device of claim 8, further comprising one or more antennas coupled to the transceiver.

10. A non-transitory computer-readable medium storing computer-executable instructions which, when executed by one or more processors result in performing operations comprising:
    receive, at a first device, a Neighbor Awareness Network (NAN) service discovery frame comprising a routing protocol message associated with a routing protocol during a discovery window and an indication to initiate an advertisement or a solicitation;
    generate, by the first device, an event message based at least in part on the routing protocol message, wherein the event message comprises information for constructing or maintaining a routing table for a mesh network;
    cause to send the event message to an upper protocol layer of the first device; and
    perform by the upper protocol layer one or more of constructing or maintaining the routing table based on the event message.

11. The non-transitory computer-readable medium of claim 10, wherein a type of the NAN service discovery frame is based at least in part on a type of the routing protocol message.

12. The non-transitory computer-readable medium of claim 11, wherein the type of the routing protocol message comprises one of an advertisement or a solicitation.

13. The non-transitory computer-readable medium of claim 11, wherein the type of the NAN service discovery frame comprises one of publish or subscribe.

14. The non-transitory computer-readable medium of claim 10, wherein the computer-executable instructions further comprise instructions to cause to send the event message to an upper layer of the routing protocol.

15. The non-transitory computer-readable medium of claim 10, wherein the event message comprises at least one of a discovery result event or a reply event.

16. The non-transitory computer-readable medium of claim 10, wherein the NAN service discovery frame comprises a service information field of a service descriptor attribute, the service information field comprising contents of the routing protocol message.

17. A method comprising:
    assigning, by a first device, a Neighbor Awareness Network (NAN) service name to a routing protocol;
    determining, by the first device, a NAN service discovery frame comprising a routing protocol message of the routing protocol, wherein the routing protocol message includes information for constructing or maintaining a routing table for a mesh network; and
    causing to send, from the first device, the NAN service discovery frame to a second device during a discovery window, wherein the NAN service discovery frame comprises an indication to initiate an advertisement or a solicitation.

18. The method of claim 17, wherein a type of the NAN service discovery frame is based at least in part on a type of the routing protocol message.

19. The method of claim 18, wherein the type of the routing protocol message comprises one of an advertisement or a solicitation.

20. The method of claim 18, wherein the type of the NAN service discovery frame comprises one of publish or subscribe.

* * * * *